US006724407B1

(12) United States Patent
Cheng

(10) Patent No.: US 6,724,407 B1
(45) Date of Patent: Apr. 20, 2004

(54) METHOD AND SYSTEM FOR DISPLAYING CONVENTIONAL HYPERMEDIA FILES IN A 3D VIEWING ENVIRONMENT

(75) Inventor: Gavin Cheng, San Francisco, CA (US)

(73) Assignee: Muse Corporation, San Francisco, CA (US)

( * ) Notice: Subject to any disclaimer, the term of this patent is extended or adjusted under 35 U.S.C. 154(b) by 0 days.

(21) Appl. No.: 09/498,632

(22) Filed: Feb. 7, 2000

(51) Int. Cl.$^7$ ................................................ G09G 5/00
(52) U.S. Cl. ...................................... 345/848; 345/850
(58) Field of Search ................................. 345/848, 849, 345/850, 851, 852, 782, 760, 749

(56) References Cited

U.S. PATENT DOCUMENTS

| | | | |
|---|---|---|---|
| 5,404,393 A | 4/1995 | Remillard | 379/96 |
| 5,572,643 A | 11/1996 | Judson | 395/793 |
| 5,644,714 A | 7/1997 | Kikinis | 395/200.03 |
| 5,675,721 A | 10/1997 | Freedman et al. | 395/129 |
| 5,708,764 A | 1/1998 | Borrel et al. | 395/119 |
| 5,732,232 A | 3/1998 | Brush, II et al. | 395/339 |
| 5,757,669 A | 5/1998 | Christie et al. | 364/514.006 |
| 5,768,528 A | 6/1998 | Stumm | 395/200.61 |
| 5,774,670 A | 6/1998 | Montulli | 395/200.57 |
| 5,784,570 A | 7/1998 | Funkhouser | 395/200.77 |
| 5,819,285 A | 10/1998 | Damico et al. | 707/104 |
| 5,841,980 A | 11/1998 | Waters et al. | 395/200.34 |
| 6,018,347 A | 1/2000 | Willis | 345/419 |
| 6,026,371 A * | 2/2000 | Beck et al. | 705/14 |
| 6,091,417 A * | 7/2000 | Lefkowitz | 345/839 |

(List continued on next page.)

FOREIGN PATENT DOCUMENTS

| | | | |
|---|---|---|---|
| DE | 29915185 U1 | 11/1999 | G06F/3/33 |
| WO | WO 96/34466 | 10/1996 | H04H/1/00 |
| WO | WO 98/21679 | 5/1998 | G06F/17/60 |
| WO | WO 98/23059 | 5/1998 | |

OTHER PUBLICATIONS

K. Mathews, "Three–Dimensional Sketching: Architectural Design Software Proposal—1988", [Internet] http://www.designlaboratory.com/faculty/matthews.kevin/mp3.02b.html, Aug. 1988.

(List continued on next page.)

*Primary Examiner*—Kristine Kincaid
*Assistant Examiner*—Thanh T Vu
(74) *Attorney, Agent, or Firm*—Joe Zheng

(57) ABSTRACT

A method and a software program running on a server computer coupled to a network, such as the internet, includes a three-dimensional (3D) viewing environment generating module. When a resource locator identifying a requested hypermedia resource, probably input by a pc user logged onto the network, is received from the network by a server computer, the 3D viewing environment generating module generates a 3D viewing environment corresponding to and preferably including the requested hypermedia resource. The 3D viewing environment is sent over the network to the user's pc enabling the user to view the requested hypermedia resource in an overlay 3D viewing environment, probably already running on the user's pc. A software program also provides instructions for a computer running a 3D browser to provide a viewing environment in a 3D space having one or more displays including a conventional hypermedia resource identifiable by a conventional resource locator. One or more additional displays may also be provided in the same viewing environment, wherein the additional displays each show an auxiliary hypermedia resource fetched from the network. A request may be generated for the 3D viewing environment displaying the conventional hypermedia resource when it is determined that the resource is not pre-designed for viewing with the 3D browser. In this case, the conventional hypermedia resource is fetched from the network and displayed within the 3D viewing environment. The auxiliary hypermedia resources may be commercial advertisements that can be viewed simultaneously with the conventional hypermedia source in the same 3D viewing environment.

14 Claims, 8 Drawing Sheets

U.S. PATENT DOCUMENTS

| | | | |
|---|---|---|---|
| 6,219,045 B1 | 4/2001 | Leahy et al. | 345/331 |
| 6,237,030 B1 * | 5/2001 | Adams et al. | 709/218 |
| 6,243,093 B1 * | 6/2001 | Czerwinski et al. | 345/764 |
| 6,331,858 B2 * | 12/2001 | Fisher | 345/582 |

OTHER PUBLICATIONS

S. Benford, "A Spatial Model of Interaction in Large Virtual Environments,", *Presented at Third European Conference on Computer–Supported Cooperative Work (ECSCW '93)*, Proceedings Kluwer Academic Publishers, pp. 107–132, Sep. 1993. Attached is copy of the paper submitted to the Conference, pp. 1–15.

J. Barrus et al., "Locales and Beacons: Efficient and Precise Support for Large Multi–User Virtual Environments" *Technical Report TR95–16A, IEEE Computer Graphics and Applications*, vol. 16, No. 6, pp. 50–57, Nov. 1996. Attached is a copy of the report from an unknown source, pp. 1–16.

H. Abrams, "Three–Tiered Interest Management for Large–Scale Virtual Environments," *Proceedings of the VRST 98*, [Internet] http://npsnet.nps.navy.mil/zyda/pubs/vrst98.pdf, Nov. 1998.

"Genius–PC Receives Awards in Italy", [Internet] http://www.geniusnet.com.tw/genius/news/venusitaly.htm. Printed Aug. 25, 2000.

"NetScroll Optical: The High–Precision Scroll Optical Mouse," [Internet] http://geniusnet.com.tw/genius/pro/mouse/netscrolloptical.htm, Printed Aug. 25, 2000.

"Green Finger Pointer: FingerMouse III," [Internet] http://www.greenworld.net/html/fpointer.htm, Printed Aug. 25, 2000.

"Hyper 3–D Pinball", [Internet] http://www.pcgameworld.com/reviews/h/hyper3dpinball/index.htm, Printed Aug. 25, 2000.

"OBD–2 Automotive Scan Tool Browse 3–D scrolling real time chart screen shot", [Internet] http://www.obd–2/dat3dg.htm, Printed Aug. 25, 2000.

"Worlds.com Awarded U.S. Patent for Scalable 3D Client Server", [Internet] http://www.gamasutra.com/php–bin/product_news_display.php?story=348, pp. 1–2, Apr. 25, 2001.

A. Patrizio, "3–D Patent a World of Trouble?", [Internet] http://www.wired.com/news/print/0.1294.43490.00.html, p. 1.,May 3, 2001.

* cited by examiner

| Domain names | 3D view environment | Auxiliary hypermedia sources |
|---|---|---|
| www.yhool.com | File A | A1, A2, A3 … |
| www.msn.com | File B | B1, B2, B3 … |
| ⋯ | ⋯ | ⋯ |

*Fig. 6*

METHOD AND SYSTEM FOR DISPLAYING CONVENTIONAL HYPERMEDIA FILES IN A 3D VIEWING ENVIRONMENT

BACKGROUND OF THE INVENTION

1. Field of the Invention

The present invention is related to the area of Internet browser applications and more particularly related to a method and system for providing additional displaying spaces while displaying a conventional hypermedia source without affecting contents in the conventional hypermedia source, wherein the conventional hypermedia source is commonly accessible and displayable by a conventional internet browser such as Internet Explorer from Microsoft Corporation and Netscape Communicator from Netscape Communications Corporation.

2. Description of the Related Art

Conventional internet browsers running on personal computers can only locate and retrieve files from servers having limited types and forms of content and features. Conventional browsers limit users to a basic environment that is only nominally configurable via a small group of "preferences." A user visually moves a cursor around a graphic display typically by mouse or keypad inputs. The user can hyperlink to other internet locations or web pages by executing specially highlighted texts or two-dimensional metaphors for desired internet locations. The user is typically alone in the browser environment, but may chat with another user by expression-limited text boxes, or through an audio link that functions much like a telephone handset connection.

There are applications that provide realistic rendering spaces for experiencing audio and/or visual content. These applications are typically not configurable and don't provide means for surfing the internet. Some examples include games applications and audio/video CDs and DVDs that incorporate sophisticated graphics. The games applications allow multiple users to interact, but only under the restrictions of the games programs. These applications programs do not provide a way to leverage rich media or to display HTML objects. The audio/video DVDs typically provide a solitary experience where a user executes an object and views and listens to audio and video files without interaction with other users.

FIG. 1 shows an example of a popular conventional hypermedia resource, i.e., the Yahoo™ homepage. A user of a conventional world wide web browser may pull the Yahoo™ homepage up on his or her personal computer display by entering a resource locator, e.g., www.yahoo.com, corresponding to a Yahoo™ server. If the user is logged onto the internet, then when the user inputs the resource locator, the Yahoo™ homepage is pulled from the Yahoo™ server and displayed on the user's pc display in the current window. If another hypermedia resource was located in that window before the request for Yahoo™ was sent over the web to the Yahoo™ server, then that other resource will be replaced by the Yahoo™ homepage as the Yahoo™ server responds to the user's request. It is possible to return to that other resource by "going back." However, the other resource will replace the Yahoo™ homepage when the user goes back.

If the user wants to maintain the resource in the current window of the user's pc display and also retrieve the Yahoo™ homepage for contemporaneous viewing, then the user may first minimize the current window, before sending the request for the Yahoo™ homepage. In this case, the Yahoo™ homepage will come into a new window that can be reduced in size such that the other resource that was minimized can be brought into the display alongside the Yahoo homepage. Of course, only one page, i.e., the user selected active window, will respond to user inputs at any given time. The processor of the user's pc can, however, execute instructions regarding multiple windows at the same time, although the processing for each window may occur more slowly than it would if the user's processor, RAM, etc., were only working on one process. It is desired to be able to harmonize multiple hypermedia resources together in a single realistic viewing environment.

Advertisements are often dispersed throughout homepages of various sites. Some of these ads are executable or include a hyperlink to a page wherein more information or an opportunity to buy the product or service being advertised is available. Sometimes a request for a resource will result in an advertisement showing up on the user's pc display before the resource arrives or before the resource is displayed. The advertisement gets a "hit" when this happens. Sometimes the user is required to make a decision about the advertisement before it will go away, such as whether to order the product that is displayed or not. In this case, the advertisement not only gets a hit, but the company paying for the ad also gets an opportunity for a sale.

Another advertising method is to provide a "frame" that remains permanently on the user's display as the user browses in an otherwise typical way. Many internet service providers today will provide internet access free of charge if the user agrees to carry this frame around as he or she browses. Yet another advertising method involves receiving cyber cash for scrolling through advertisements (see www-.cybergold.com and U.S. Pat. No. 5,794,210). It is desired to be able to harmonize one or more hypermedia resources, including one or more "auxiliary" resources such as advertisements, together in a single realistic viewing environment.

SUMMARY OF THE INVENTION

A method and a software program running on a server computer connected to a network, such as the internet, including a three-dimensional viewing environment generating module are provided in accordance with the present invention. When a resource locator identifying a requested hypermedia resource, probably input by a pc user logged onto the network, is received from the network by the server computer, the three-dimensional viewing environment generating module generates a three dimensional viewing environment corresponding to and preferably including the requested hypermedia resource. The three-dimensional viewing environment is sent over the network to the user's pc enabling the user to view the requested hypermedia resource in an overlay three-dimensional viewing environment, probably already running on the user's pc.

A software program also provides instructions for a computer running a 3D browser to provide a viewing environment in a 3D space having one or more displays including a conventional hypermedia resource identifiable by a conventional resource locator. One or more additional displays may also be provided in the same viewing environment, wherein the additional displays each show an auxiliary hypermedia resource fetched from the network. A request may be generated for the 3D viewing environment displaying the conventional hypermedia resource when it is determined that the resource is not pre-designed for viewing with the 3D browser. In this case, the conventional hypermedia resource is fetched from the network and displayed within the 3D viewing environment. The auxiliary hypermedia resources may be commercial advertisements that can be viewed simultaneously with the conventional hypermedia source in the same 3D viewing environment.

A method is provided wherein a 3D viewing overlay is activated on a client computer, and a resource locator identifying a conventional hypermedia resource is output to a computer network. A 3D viewing environment is received wherein the hypermedia resource is displayed therein, within the overall 3D overlay. The 3D viewing environment preferably also includes one or more displayed auxiliary resources, such as advertisements, that may be viewed along with the conventional resource.

A method for providing the 3D viewing environment for the hypermedia resource by a server computer includes receiving a request including a resource locator identifying the hypermedia resource from the network, and outputting the 3D viewing environment to the network in response to the request. The method preferably includes checking whether a 3D viewing environment already exists for the hypermedia resource, and then if the checking reveals that a 3D viewing environment does not already exist, then one is generated. If the checking reveals that the 3D viewing environment does already exist, then it is retrieved and output to the network.

BRIEF DESCRIPTION OF THE DRAWINGS

FIG. 6 illustrates an organizational file archive of the domain manager of FIG. 5.

DETAILED DESCRIPTION OF THE PREFERRED EMBODIMENTS

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, steps, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art. The method along with the system to be described in detail below is a self-consistent sequence of processes leading to one or more desired results. It proves convenient at times, principally for reasons of common usage, to refer to data as messages, requests, values, elements, symbols, terms, numbers, or the like. It should be borne in mind that all of these similar terms are to be associated with the appropriate physical quantities and are merely convenient labels applied to these quantities.

Several preferred embodiments are described below with reference to attached FIGS. 2–8. To facilitate the description of the present invention, it is defined herein a display screen or a screen is the physical display apparatus in a device, such as a 15 inch CRT or LCD monitor commonly used with a personal computer. A screen display, a displayed web page, a displayed window or simply a display is an image presented on the display screen. For example, a file that constitutes a display may be an HTML file, wherein HTML stands for HyperText Markup Language, an image or a display thereof provided on a display screen when the file is read by a browser. In addition, a conventional hypermedia resource is referred to herein as a hypermedia resource conventionally retrieved from a network by a conventional Internet browser such as Internet Explorer from Microsoft Corporation and Netscape Communicator from Netscape Communications Corporation.

Figure 2:
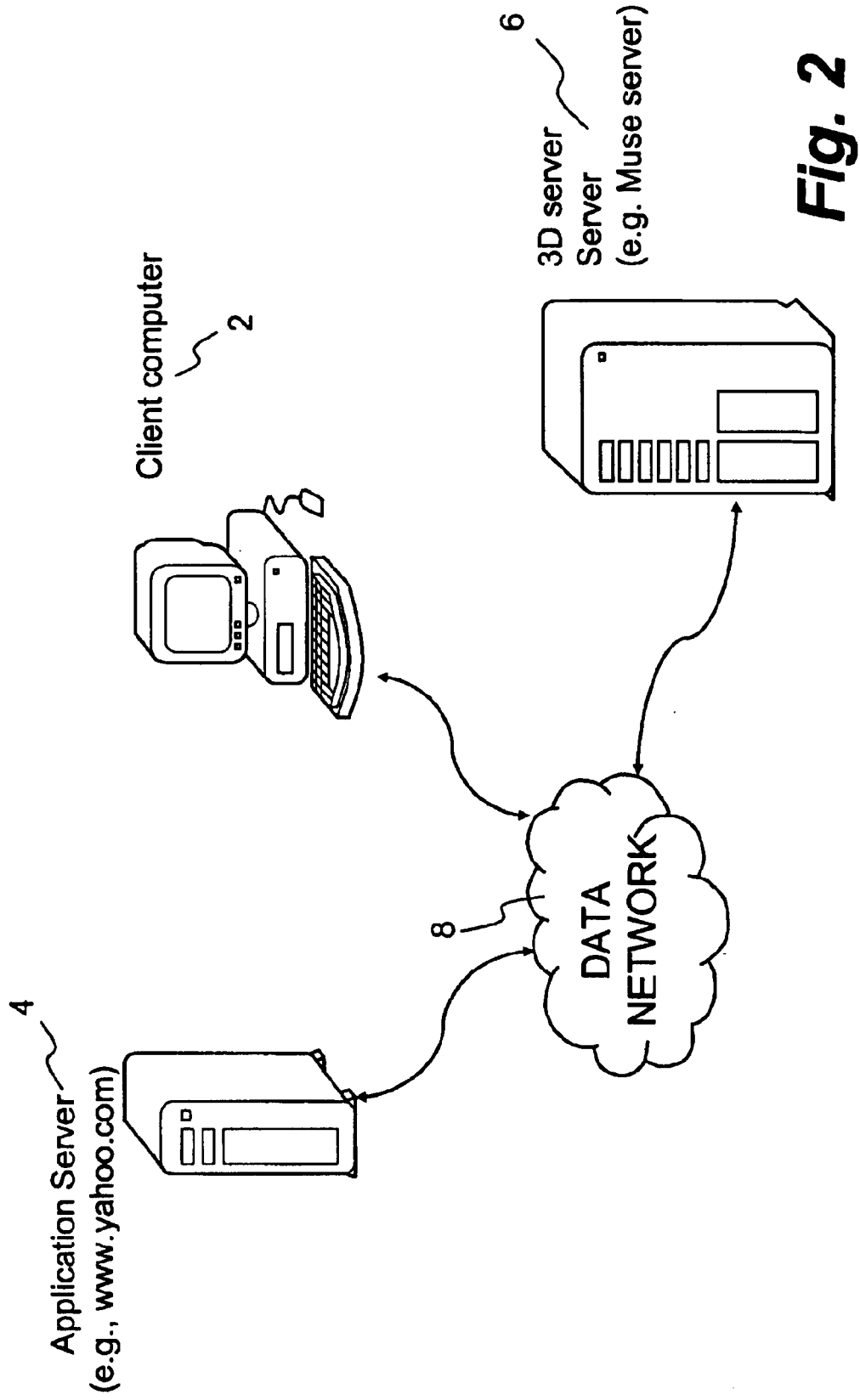
FIG. 2 schematically shows client and server computer hardware interconnections in accord with the preferred embodiment.

FIG. 2 schematically shows client and server computer hardware interconnections in accord with a preferred embodiment. Each of a terminal device 2, a conventional web server 4 and a 3D server 6 are shown interconnected through a network 8. The terminal device 2 may be a personal computer, a set top box, a television set configured for browsing the internet, such as using WebTV™, a cellular phone, a pager, a palm pilot™ or similar device, or any other internet, web or network capable device.

The conventional server 4 typically has software and one or more databases having information such as web pages available for downloading or browsing using a conventional browser. An example of a conventional server 4 is one in which requests for access to the Yahoo™ homepage on the world wide web are routed when a user inputs the resource locator www.yahoo.com from terminal device 2, e.g., by keyboard or voice input or by executing a hyperlink from another web resource.

The 3D server 6 is preferably a Muse™ server, and may be any other server configured for uploading, downloading, generating, providing, accessing, storing, designing, or otherwise, 3D viewing environments, 3D browsers and 3D viewing overlays. Preferably, the 3D server 6 and the terminal device 2 are each particularly configured, e.g., with software and/or databases, for enabling the above devices and functions for incorporating XML objects or HTML objects, within a 3D browser, viewing overlay or viewing environment. Some preferred functions, capabilities and configurations of a 3D browser are described in U.S. patent applications Ser. Nos. 09/375,476 and 60/096,884, each of which is assigned to the same assignee as the present application and is hereby incorporated by reference.

The network 8 may be the internet, the world wide web, a local area network (LAN), an intranet, or any other configuration of two or more connected computers. Specific application is envisioned for use with the internet and the world wide web.

The conventional web server 4 typically has one or more hypermedia resources loaded onto it that may be accessed via the network 8. The server 4 receives requests from the network 8 for one or more of these hypermedia resources, each identified by a respective resource locator. Further the hypermedia resources on the server 4 are viewable using the conventional browsers. When one of the hypermedia resources is received, the 3D viewing environment provided in the terminal device will produce a display of the conventional hypermedia resource together with other hypermedia resources.

As an example, when a request for a conventional hypermedia resource is received by the server 4 from a terminal device 2 running a conventional browser, the conventional hypermedia resource is output to the terminal device 2 via the network 8 from the server 4. On the other hand, when a request for a conventional hypermedia resource is received by the server 4 from a terminal device 2 running a 3D overlay such as a Muse™ client or Muse™ browser or overlay, then the 3D viewing environment including the conventional hypermedia resource is output to the terminal device 2, if one exists on the server 4.

The server 4 might not have a 3D viewing environment for displaying the requested conventional hypermedia resource within the 3D overlay, e.g., of the Muse™ client. In that case, software running on the terminal device 2 and providing a 3D viewing overlay, e.g., the Muse client™, sends a request over the network 8 to the 3D server 6 for a 3D viewing environment including a display for the conventional hypermedia resource originally requested. The 3D server 6 either calls up an existing 3D viewing environment for the requested conventional hypermedia resource from its own memory or from another 3D server such as may be another Muse server computer, or generates an original 3D viewing environment for the resource, particularly when there is no existing 3D viewing environment available for the requested resource. The 3D server 6 and the software running thereon, as well as the client software program running on the terminal device 2, are explained in more detail below.

Figure 3:
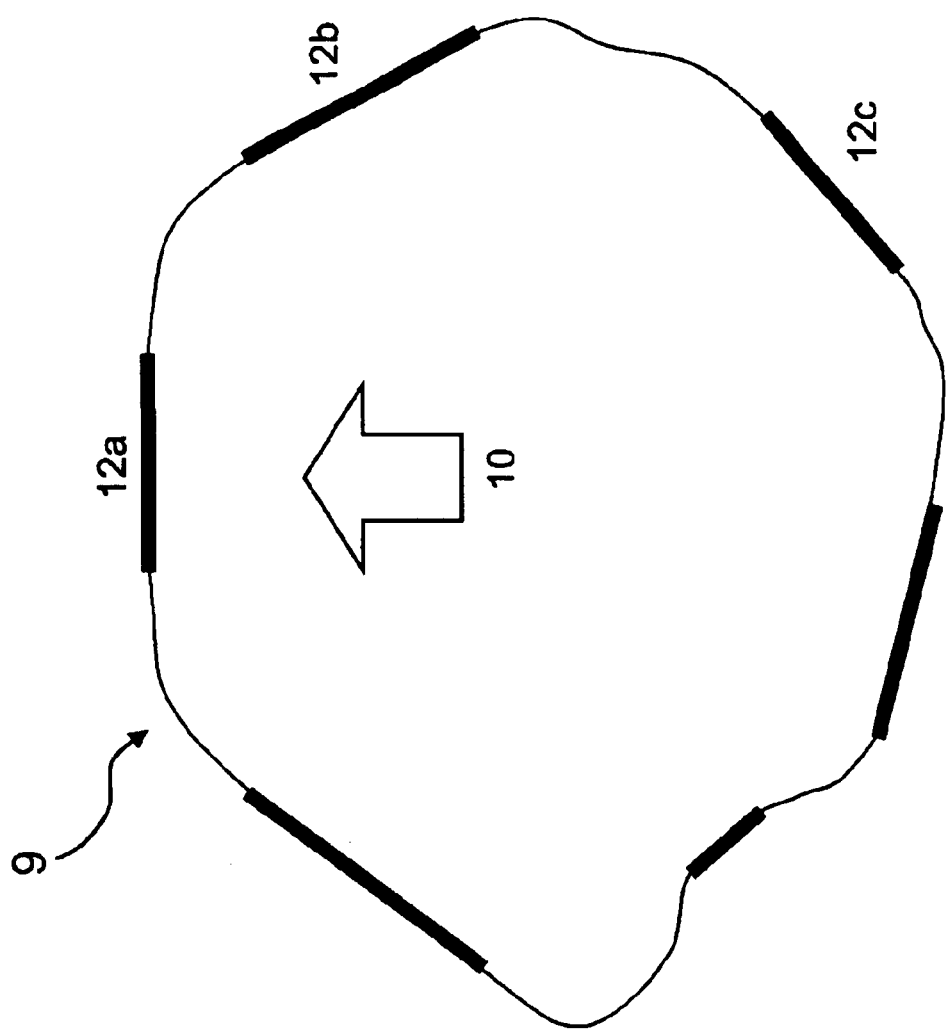
FIG. 3 is a perspective illustration in accord with the preferred embodiment.

FIG. 3 is a perspective illustration of a 3D viewing environment or overlay 9 in accord with the preferred embodiment. The arrow 10 indicates a viewing direction corresponding to the current perspective of the user. The perspective shows that a display 12a is being viewed by the user who may move around to view a partial, a combination or other displays such as 12a, 12b, 12c, etc. Specifically if the user turned his or her view, relative to the perspective of FIG. 3, within the 3D overlay 9 clockwise about ninety degrees, then the user would be viewing the content of the display 12b. A little further clockwise and the user would be viewing the content of display 12c, etc.

The user may decide to turn from viewing the content of the display 12a directly to a viewing perspective wherein the user would be viewing the content of the display 12c. In this case, the user would turn from viewing the content of display 12a, through a view of the content of the display 12b, and ultimately to a view of the content of display 12c. Advantageously, the user would view the content of display 12b during the turn from display 12a to display 12c even though the user did not intend to do so. The hypermedia resource being displayed at display 12b would register a hit as a result of the user's decision to change from viewing display 12a to viewing display 12c. Also advantageously, more than one hypermedia resource, i.e., the respective content within the displays 12a, 12b, 12c, etc., is available for viewing within the same viewing environment 9, as illustrated in FIG. 3.

Figure 4:
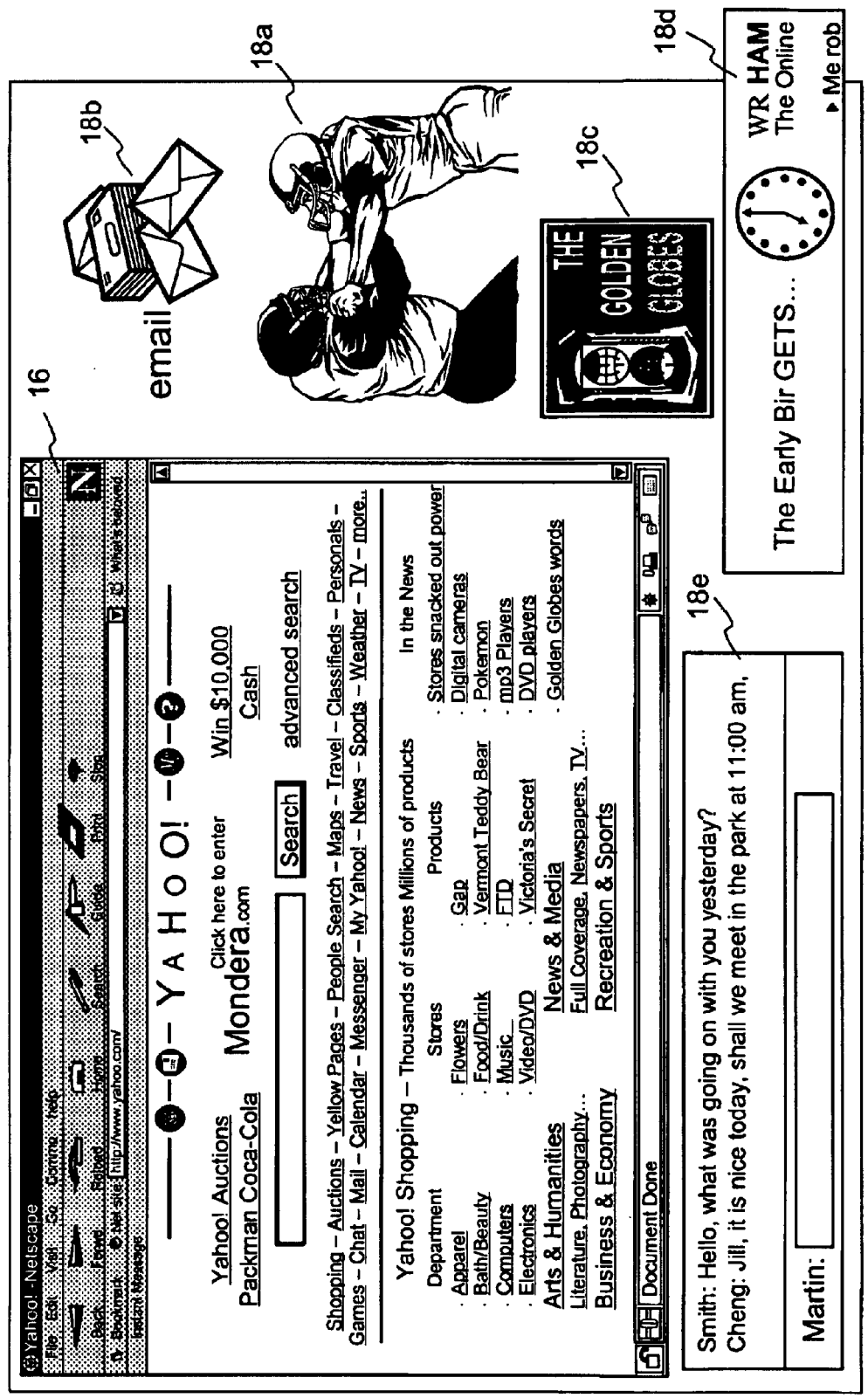
FIG. 4 illustrates a viewing environment including the conventional hypermedia resource of FIG. 2 and multiple auxiliary hypermedia resources.

FIG. 4 illustrates an exemplary perspective view in a display 14 in a viewing environment or overlay. Display 14 including the conventional hypermedia resource 16 shown and discussed above with respect to FIG. 2, i.e., the Yahoo™ homepage, and multiple additional hypermedia resources 18a–18e, preferably including one or more auxiliary hypermedia resources (see below). FIG. 4 is a two-dimensional (2D) illustrative depiction of what is preferably a 3D viewing environment in accord with a preferred embodiment. Even though FIG. 4 is in 2D, many advantages of the actual 3D viewing environment of the preferred embodiment may be envisioned and are described below.

In addition to the conventional hypermedia resource 16, the user may view and utilize within the 3D overlay 14 a video resource 18a, an email account 18b, a link to a web site related to the Golden Globes 18c, an advertisement (partially shown, see below) 18d, and a chat box 18e. The various hypermedia resources 16 and 18a–18e shown at FIG. 4 may be arranged above or below or to the left or to the right of each other within the overlay 14. Although not shown in FIG. 4, the various hypermedia resources 16, 18a–18e may also be arranged into or out of the page relative to each other.

The complete or overall 3D overlay 14 is not totally in the view of the user. That is, there are also displays that are currently out of view to the left, right, above, below, and/or behind the user's view. The user may change his or her view by turning, moving, flying, jumping, etc. in the viewing environment so that these other displays not currently in view may be viewed. When the user changes his or her view, some or all of the displays 16, 18a–18e may partially or totally leave the user's view. The user may late go back to the view shown in FIG. 4 or a slightly different view to bring one of the displays 16, 18a–18e back into view, though. For example, if the user moved to view the entirety of display 18d, the Yahoo™ homepage and the chat box 18e might partially leave the user's view. Other displays currently out of view to the right of FIG. 4 may come into partial or total view, and the displays 18a, 18b and 18c would move to the center of the new view. Advantageously, a hit could be potentially registered for each display 16, 18a–18e in the view of the user who chooses to interact with the display.

One of the features in the present invention is that one or more of other hypermedia resources are brought into a viewing environment along with a hypermedia resource requested by a user. For example, the user may have requested the video resource 18a, and the link 18c and advertisement 18d may have been added to the viewing environment 14 at the same time. Advantageously, the link 18c and advertisement 18d are in the view of the user and may appeal to the user who chooses to act on with one or both of them. As a result, the number of hits to those auxiliary hypermedia resources can be potentially equivalent to that of a popular web site, such as www.yahoo.com. Further the contents of the popular web site are intact.

Figure 5:
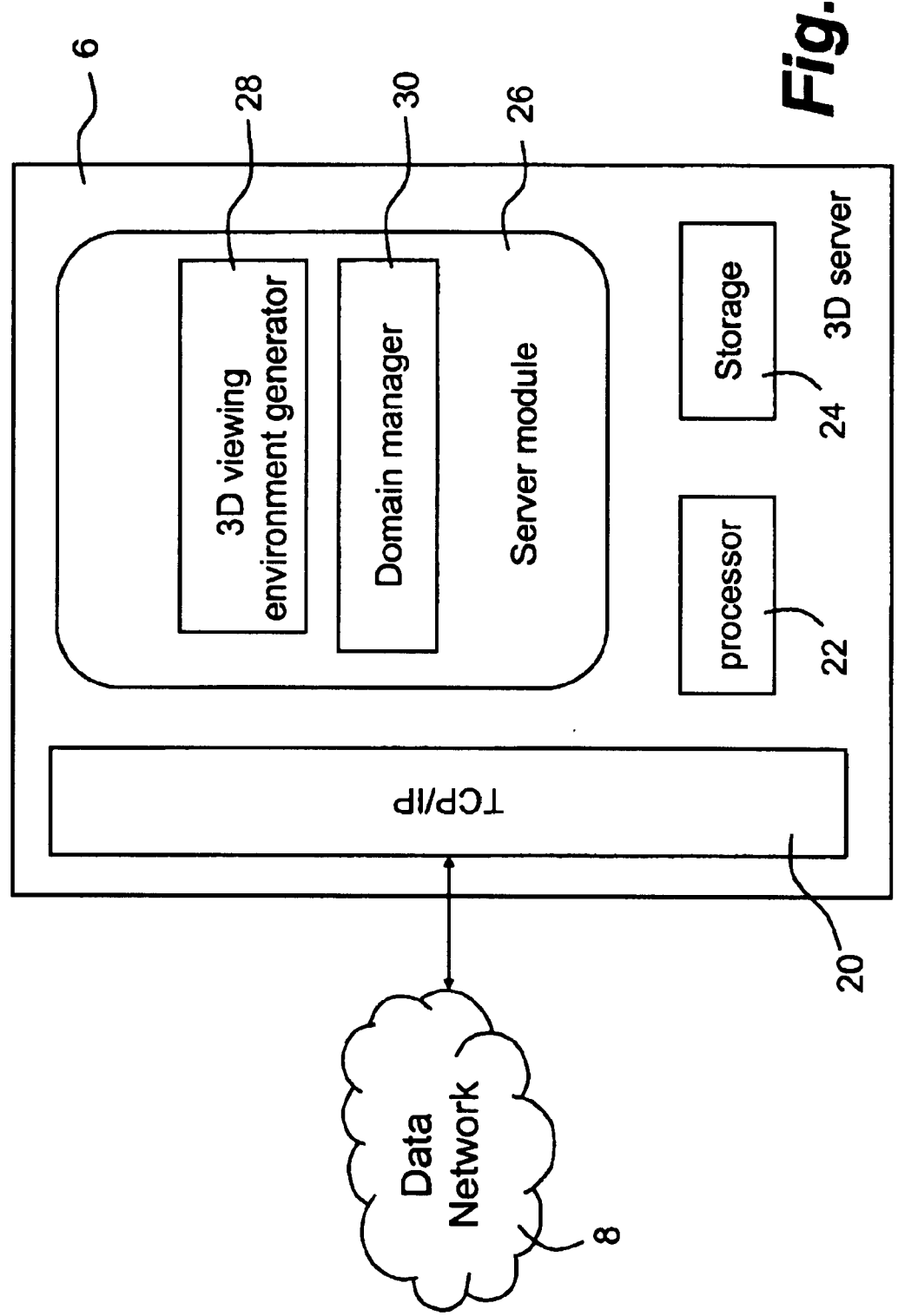
FIG. 5 schematically shows component modules of a 3D server in accord with the preferred embodiment.

FIG. 5 schematically shows component hardware and software modules of a 3D server 6 connected to a network 8 in accord with the preferred embodiment. The 3D server, e.g., a Muse™ server, is shown having a TCP/IP interface which facilitates the server to communicate with the network 8. The 3D server 6 shows additional hardware components including a processor 22 and memory or storage 24 for storing data including 3D viewing environments corresponding to various conventional hypermedia resources and auxiliary hypermedia resources. Of course, the 3D server 6 may have many other hardware components as understood by one of ordinary skill in the art.

The server module 26 is shown having a 3D viewing environment generator 28 and a domain manager 30. Again, one of ordinary skill in the art would understand the server module may have many other component modules. When a request for 3D viewing environment for a conventional hypermedia resource is received from the network 8, it will have been typically already determined by client software running on the terminal device 2 (see FIG. 2) that requested the resource that a 3D resource suitable for 3D viewing environment was not available on the conventional server 4.

The domain manager 30 is checked to see if a 3D viewing environment has been previously generated and is stored on the 3D server 6. One or more other servers associated with the 3D server 6 may also be checked, particularly if the 3D server 6 does not have such a 3D viewing environment stored in its memory 24. If there is a 3D viewing environment stored in the memory 24 corresponding to the requested resource, then the 3D viewing environment is called up from the memory 24 and output to the network 8, satisfying the request.

If there is no 3D viewing environment available that corresponds to the requested resource, then the 3D viewing environment generator 28 generates one. When the 3D viewing environment generator 28 generates the 3D viewing environment, the environment includes a display of the conventional hypermedia resource. Preferably, and advantageously, the 3D viewing environment generator 28 also includes one or more displays of each of auxiliary hypermedia resources, such as a commercial advertisement, a link, etc. that could be predetermined according to an arrangement with the respective owners of the auxiliary hypermedia resources. The generated 3D viewing environment is then output to the network 8 and routed to the terminal device 2 that requested the conventional hypermedia resource. The 3D viewing environment is then brought up on the display screen of the terminal device 2. Hits could potentially occur for each of the one or more auxiliary hypermedia resources in the 3D viewing environment.

FIG. 6 illustrates an exemplary organizational file archive 32 of the domain manager 30 of FIG. 5. When the check is performed as described above for an already generated and stored 3D viewing environment for the requested conventional hypermedia resource, the domain manager 30 searches the file archive 32 that is illustrated in FIG. 6. The file archive shows that 3D viewing environments have been previously generated and stored for conventional hypermedia resources corresponding to the resource locators www.yahoo.com and www.msn.com. The domain manager recognizes that File A contains the 3D viewing environment for www.yahoo.com and that File B contains that of www.msn.com. In addition, the domain manager realizes that auxiliary hypermedia resources A1, A2, A3 . . . and B1, B2, B3 . . . , are also included with the 3D viewing environments of www.yahoo.com and www.msn.com, respectively. Each of the conventional and auxiliary hypermedia resources associated with the requested resource locator are then called up from the memory 24, and output as the 3D viewing environment corresponding to that resource locator.

Figure 7:
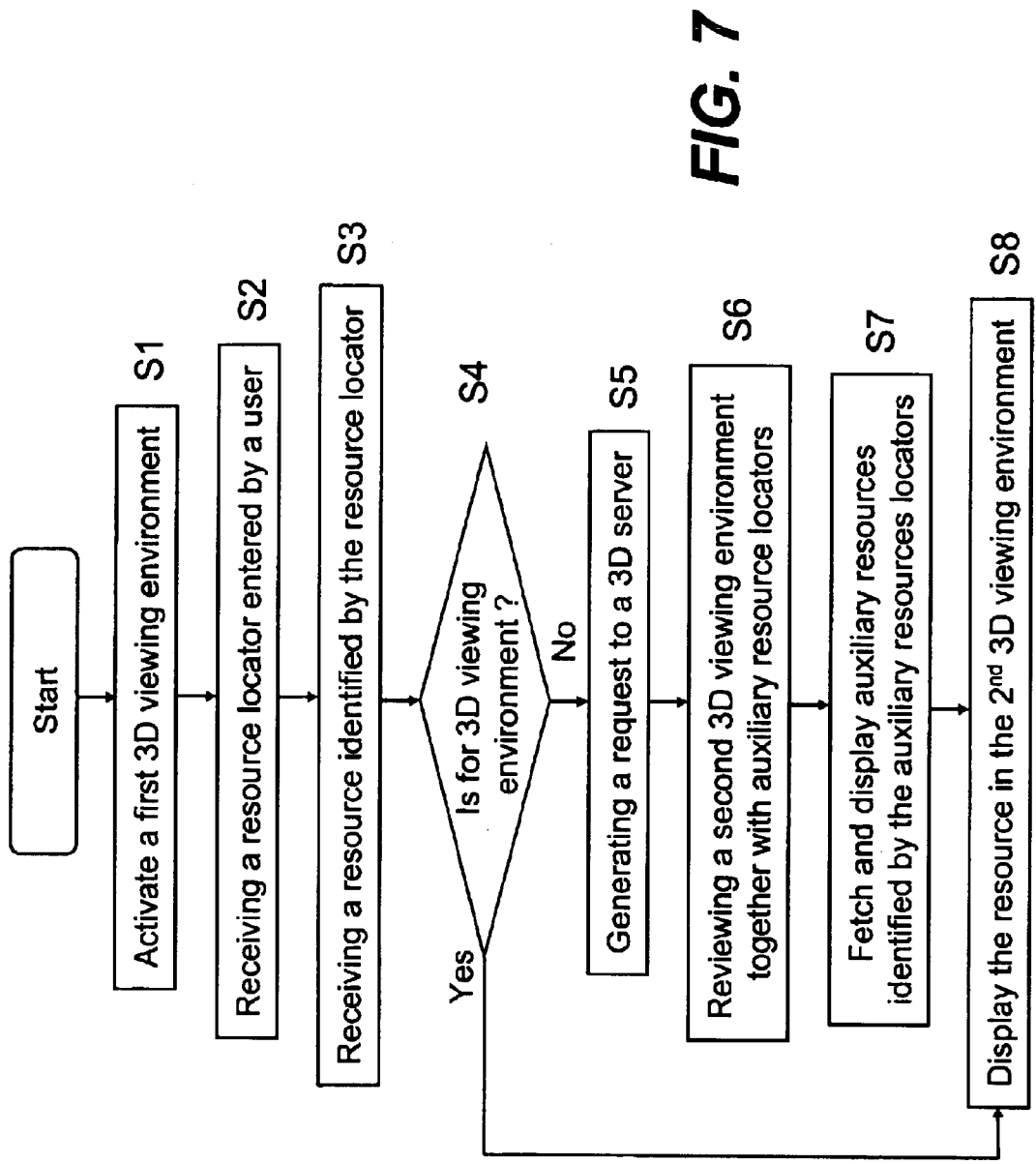
FIG. 7 is a flow chart illustrating a first preferred method of the invention.

FIG. 7 is a process flowchart according to a first preferred method of the present invention. The flow chart shown at FIG. 7 illustrates steps that a processor of a terminal device 2 running client software in accord with a preferred embodiment would perform. Some of the steps may be performed in a different order than is shown in FIG. 7. In addition, some steps may not be used and additional steps may be performed in alternative methods.

Step S1 is the activation of a first 3D viewing environment. this first 3D viewing environment is preferably one activated from the software and/or memory resident on the terminal device. The first 3D viewing environment may also be activated using input from the 3D server 6 accessed over the network 8, described above. The first 3D viewing environment may also be activated completely from input from the 3D server 6.

Figure 1:
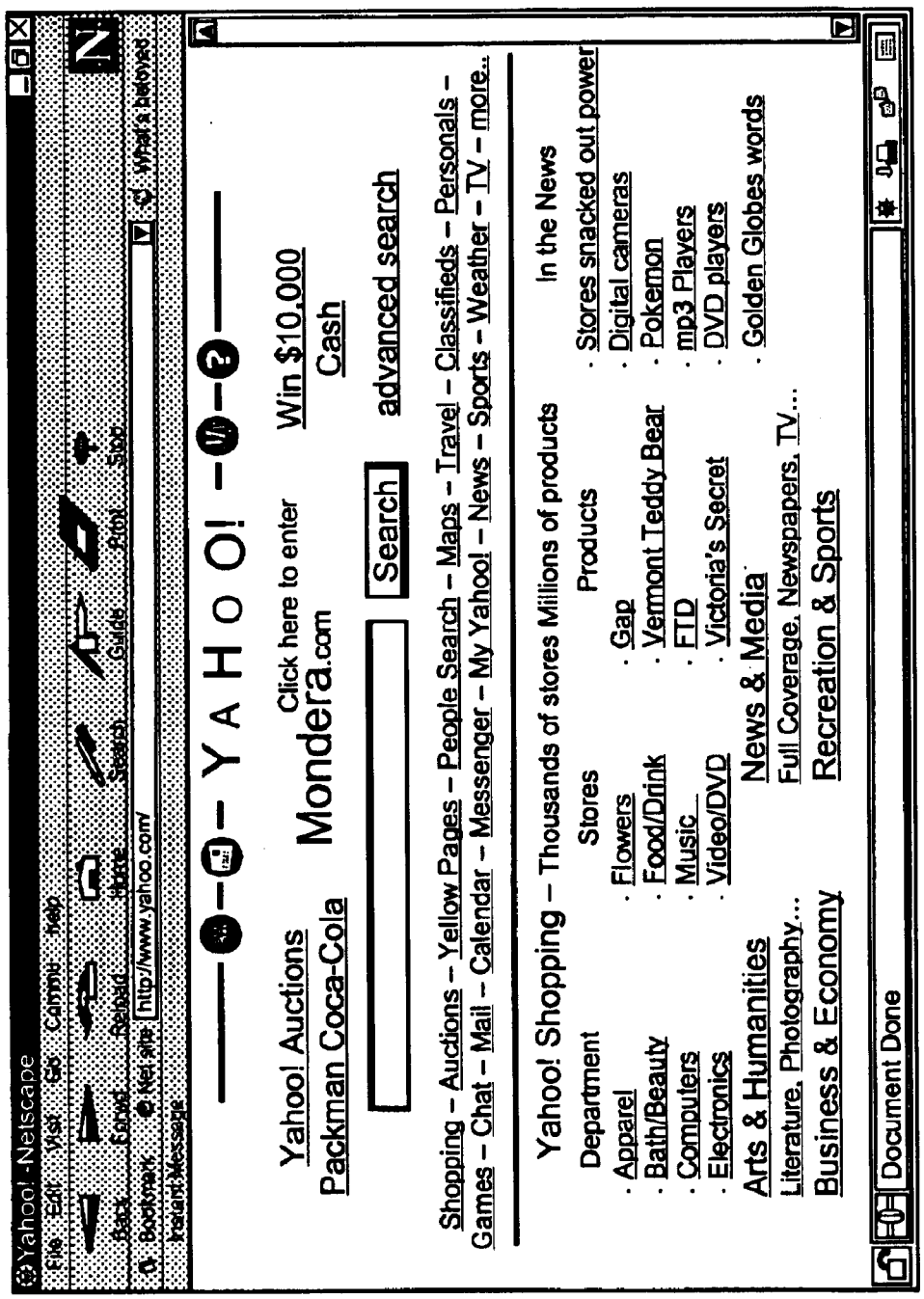
FIG. 1 illustrates a conventional hypermedia resource.

In Step S2, an input is received from a user of the terminal device 2 including a resource locator, e.g., www.yahoo.com. As discussed above, a conventional server 4 is accessed over the network 8 and a hypermedia resource corresponding to the resource locator input by the user is received at the terminal device 2 from the server 4 at step S3. The hypermedia resource may be a conventional hypermedia resource such as that shown at FIG. 1, or it may be for display in a 3D viewing environment. This is determined at step S4. If it is determined that the hypermedia resource is for a 3D viewing environment, then the processor skips to step S8 and the resource is displayed in a second 3D viewing environment on the display screen of the terminal device 2.

If it is determined at step S4 that the hypermedia resource is not for a 3D viewing environment, then a request is generated and sent to the 3D server 6 over the network 8. At step S6, a second 3D viewing environment together with auxiliary resource locators is received at the terminal device. At step S7, the auxiliary resources identified by the auxiliary resource locators received with the 3D viewing environment for the originally requested resource are fetched and displayed. At step S8, the second viewing environment is displayed including the user requested conventional hypermedia resource and the auxiliary resources fetched and displayed in step S7. Steps S6–S8 may occur in various orders, or any two or them or all three of them may occur contemporaneously or nearly contemporaneously. For example, the conventional hypermedia resource may be displayed before the auxiliary resources, and the second 3D viewing environment may be displayed before either or both of the conventional and/or auxiliary resources are displayed.

Figure 8:
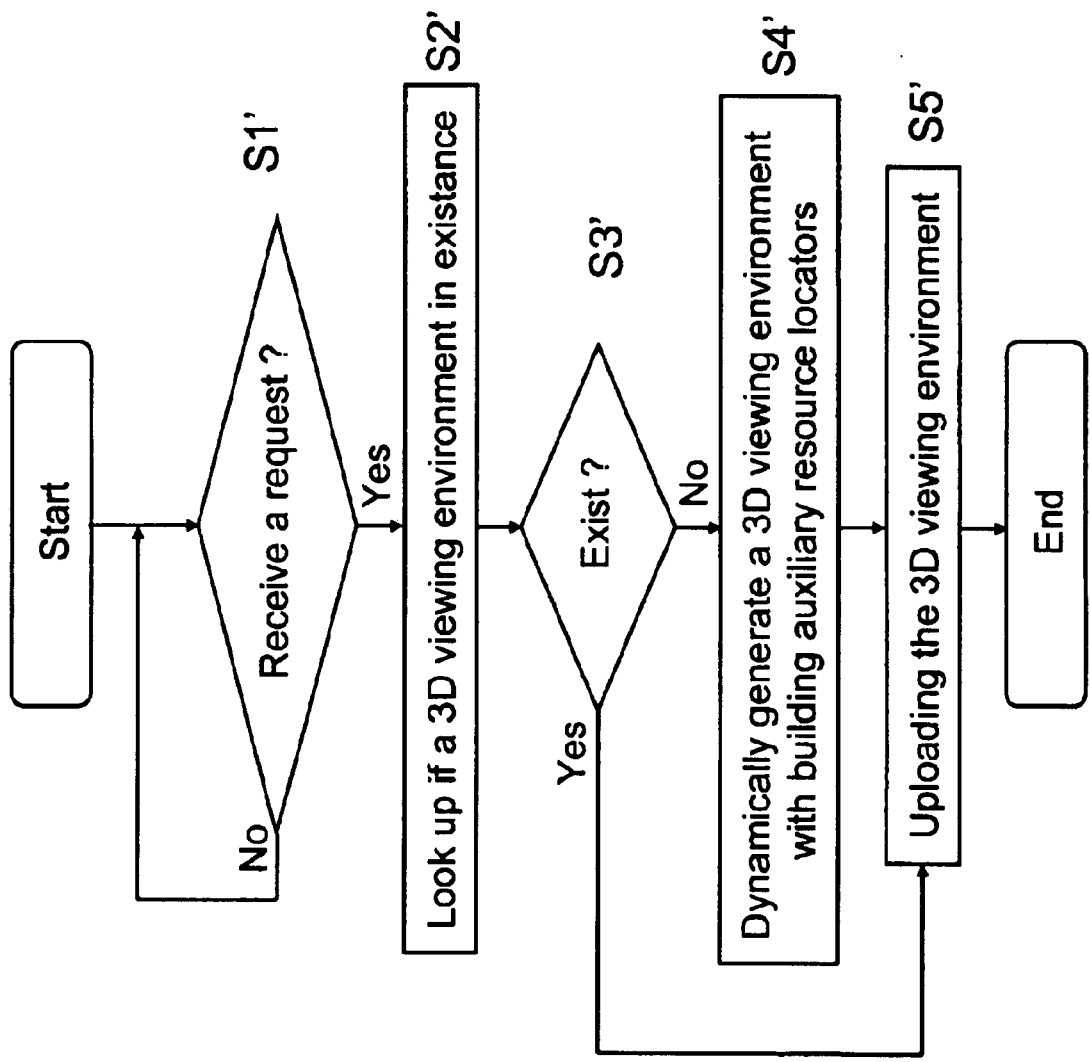
FIG. 8 is a flow chart illustrating a second preferred method of the invention.

FIG. 8 is a process flowchart illustrating a second preferred method of the present invention. The flowchart shown at FIG. 8 illustrates steps that a processor of a 3D server 6 running 3D server software in accord with a preferred embodiment would perform. As with FIG. 7, some of the steps may be performed in a different order than is shown in FIG. 8. In addition, some steps may not be used and additional steps may be performed in alternative methods.

At Step S1', it is determined whether a request has been received for a 3D viewing environment identified by a resource locator. If it is determined that no request has been received, then step S1' is repeated. If it is determined that a request has been received, then, at step S2', the processor 22 of the 3D server 6 looks up whether a 3D viewing environment is in existence, e.g., as described above with respect to FIGS. 5 and 6.

If it is determined at step S3' that a 3D viewing environment does exist corresponding to the requested resource, then the processor skips to step S5', and the 3D viewing environment is uploaded, e.g., from the memory 24. If it is determined that a 3D viewing environment does not exist corresponding to the requested resource, then the method goes from step S3' to step S4'.

At step S4', a 3D viewing environment is dynamically generated together with building auxiliary resource locators, e.g., as described above. Then, the dynamically generated 3D viewing environment is uploaded at step S5'.

Those skilled in the art will appreciate that the just-disclosed preferred embodiments are subject to numerous

What is claimed is:

1. A method for viewing network resources, the method comprising:

activating a first 3D viewing environment displaying simultaneously one or more predetermined hypermedia resources, the predetermined hypermedia resources being so structured as if a viewer is positioned in the first 3D viewing environment;

receiving a resource locator in the first 3D viewing environment;

when a resource identified by the resource locator is determined pertaining to a 3D viewing environment, displaying a second 3D viewing environment structured from the resource identified by the resource locator, wherein the second 3D viewing environment includes one or more predetermined hypermedia resources structured as if the viewer can virtually navigate in the second 3D viewing environment from one hypermedia resource to another;

when a resource identified by the resource locator is determined not pertaining to a 3D viewing environment,
generating a request to be sent to a server configured to produce a third 3D viewing environment;
fetching the resource; and
structuring a display from the resource together with one or more predetermined hypermedia resources in the third 3D viewing environment such that when the viewer navigates to the display, the predetermined hypermedia resources can be inadvertently viewed by the viewer.

2. The method of claim 1, wherein the display is configured to display a conventional hypermedia resource.

3. The method of claim 2, wherein the one or more predetermined hypermedia resources in the third 3D viewing environment are so structured such that the display is viewed as if the display is one of the one or more predetermined hypermedia resources in the third 3D viewing environment.

4. The method of claim 1, wherein the structuring of the display from the resource together with one or more predetermined hypermedia resources comprises:

receiving the hypermedia resources from the server for the third 3D viewing environment; and placing the display in the third 3D viewing environment.

5. The method of claim 4, further comprising consulting with a diagnostic module tabulating information concerning one or more previously generated and stored 3D viewing environments each corresponding to a hypermedia resource to determine whether a previous 3D viewing environment corresponding to the request has been generated or stored.

6. The method of claim 1, wherein each of the first, second and third 3D viewing environments is locally generated in accordance with one or more hypermedia resources.

7. The method of claim 6, wherein as the viewer navigates in the first, second or third 3D viewing environment, additional one or more hypermedia resources are revealed and can be activated if so desired.

8. A computer readable medium for storing computer program instructions for viewing network resources, the computer readable medium comprising:

program code for activating a first 3D viewing environment displaying simultaneously one or more predetermined hypermedia resources, the predetermined hypermedia resources being so structured as if a viewer is positioned in the first 3D viewing environment;

program code for receiving a resource locator in the first 3D viewing environment;

when a resource identified by the resource locator is determined pertaining to a 3D viewing environment,
program code for displaying a second 3D viewing environment structured from the resource identified by the resource locator,
wherein the second 3D viewing environment includes one or more predetermined hypermedia resources structured as if the viewer can virtually navigate in the second 3D viewing environment from one hypermedia resource to another;

when a resource identified by the resource locator is determined not pertaining to a 3D viewing environment,
program code for generating a request to be sent to a server configured to produce a third 3D viewing environment;
program code for fetching the resource; and
program code for structuring a display from the resource together with one or more predetermined hypermedia resources in the third 3D viewing environment such that when the viewer navigates to the display, the predetermined hypermedia resources can be inadvertently viewed by the viewer.

9. The computer readable medium of claim 8, wherein the display is configured to display a conventional hypermedia resource.

10. The computer readable medium of claim 9, wherein the one or more predetermined hypermedia resources in the third 3D viewing environment are so structured such that the display is viewed as if the display is one of the one or more predetermined hypermedia resources in the third 3D viewing environment.

11. The computer readable medium of claim 8, wherein the program code for structuring the display from the resource together with one or more predetermined hypermedia resources comprises:

program code for receiving the hypermedia resources from the server for the third 3D viewing environment; and program code for placing the display in the third 3D viewing environment.

12. The computer readable medium of claim 11, further comprising consulting with a diagnostic module tabulating information concerning one or more previously generated and stored 3D viewing environments each corresponding to a hypermedia resource to determine whether a previous 3D viewing environment corresponding to the request has been generated or stored.

13. The computer readable medium of claim 8, wherein each of the first, second and third 3D viewing environments is locally generated in accordance with one or more hypermedia resources.

14. The computer readable medium of claim 13, wherein as the viewer navigates in the first, second or third 3D viewing environment, additional one or more hypermedia resources are revealed and can be activated if so desired.

* * * * *